United States Patent [19]
Bienz et al.

[11] Patent Number: 5,446,760
[45] Date of Patent: Aug. 29, 1995

[54] PROGRAMMABLE DIGITAL PULSE SHAPING PHASE MODULATOR

[75] Inventors: Richard A. Bienz, Chandler; Daniel J. Morelli, Phoenix, both of Ariz.

[73] Assignee: Motorola, Inc., Schaumburg, Ill.

[21] Appl. No.: 937,001

[22] Filed: Aug. 31, 1992

[51] Int. Cl.6 .................. H04L 27/04; H04L 27/12; H04L 27/20
[52] U.S. Cl. .................. 375/295; 315/296; 332/104; 332/144; 327/106; 327/107; 327/293
[58] Field of Search .................. 375/52, 54, 67, 59, 375/44, 61, 60, 9; 332/103, 104, 144; 327/106, 107, 293

[56] References Cited

U.S. PATENT DOCUMENTS

| | | | |
|---|---|---|---|
| 3,878,464 | 4/1975 | Fletcher et al. | 325/30 |
| 4,174,505 | 11/1979 | Querry | 332/103 |
| 4,179,672 | 12/1979 | Vales | 332/103 |
| 4,261,053 | 4/1981 | Dostis et al. | 375/67 |
| 4,485,358 | 11/1984 | Andren et al. | 332/144 |
| 4,584,541 | 4/1986 | Nossen | 332/16 R |
| 4,613,976 | 9/1986 | Sewerinson et al. | 375/52 |
| 4,737,968 | 4/1988 | Norton et al. | 375/60 |
| 4,746,880 | 5/1988 | McCune Jr. | 332/144 |
| 4,932,038 | 6/1990 | Windus | 375/4 |
| 4,962,510 | 10/1990 | McDavid et al. | 375/67 |
| 5,157,693 | 10/1992 | Lemersal Jr. et al. | 375/54 |

OTHER PUBLICATIONS

An article entitled "Implementation of Coded Modems" by S. Kato et al., from IEEE Communications Magazine, Dec. 1991, pp. 88-93.

Primary Examiner—Stephen Chin
Assistant Examiner—Amanda T. Le
Attorney, Agent, or Firm—Frank J. Bogacz

[57] ABSTRACT

A digital pulse shaping and phase modulation network is used for reducing out-of-band spectral energy. This network is used in conjunction with a NCO (numerically controlled oscillator) which includes a linear phase input port. This circuit converts rectangular data pulses into a user programmed shape. The shape pulses are then modulated onto the carrier via the linear phase port. Depending on the preprogrammed pulse shape, the out-of-band spectral energy is significantly reduced.

18 Claims, 2 Drawing Sheets

PROGRAMMABLE DIGITAL PULSE SHAPING PHASE MODULATOR

BACKGROUND OF THE INVENTION

The present invention pertains to modulation and more particularly to digital phase modulation and modulators.

Typical quadrature modulators that yield bandwidth limited constant envelope signals are implemented utilizing analog components. Other quadrature modulators are fabricated using a hybrid structure of analog and digital components. Such modulators exhibit the following kinds of problems: first, significant tuning problems; second, signal drift with temperature and aging of components; and third many components are required for the implementation of analog and hybrid modulators; and fourth requires a large number of components to achieve low out-of-band energy transmission.

Constant envelope signals are important in communication systems where the communication channels have non-linearities. An example of such systems with non-linearities is a satellite power amplifier driven in its non-linear region for efficiency reasons. Pulse shaping and phase modulation circuitry are useful in transmitters for communications systems which require such constant envelope signals. Fully digital programmable shaping and phase modulation circuitry is particularly useful for such phase modulation schemes as M-ary phase shift keying (PSK), trellis coded modulation (TCM), and continuous phase modulation (CPM). Pulse shaping is of critical importance since it reduces out-of-band spectral power that can affect the link performance in adjacent channels.

Rudimentary full digital quadrature modulators have been designed. However, such fully digital quadrature modulators employ digital multipliers. Digital multipliers inherently reduce the operating speed of such circuitry and therefore reduce the throughput of such digital modulators.

What is needed is a high speed fully digital pulse shaping and phase modulator for reducing out-of-band spectral energy.

SUMMARY OF THE INVENTION

In accordance with the present invention, a novel fully digital programmable pulse shaping modulator network is shown.

A digital pulse shaping phase modulator significantly reduces transmitted out-of-band spectral energy. The digital pulse shaping phase modulator includes a direction controller which the direction controller produces a plurality of signals which indicates the magnitude of an input signal in a number of coordinate directions. In addition, the direction controller indicates the direction of the phase angle to be traversed from a past coordinate position to a new coordinate position of the input data. The modulator also includes a memory which stores preprogrammed values of a phase angle in the desired direction. The memory sequential outputs these phase angle values. These phase angle values are continuously accumulated by a phase accumulator to produce a new accumulated phase angle for the transmission of the input digital data.

DESCRIPTION OF THE PREFERRED EMBODIMENT

Figure 1:
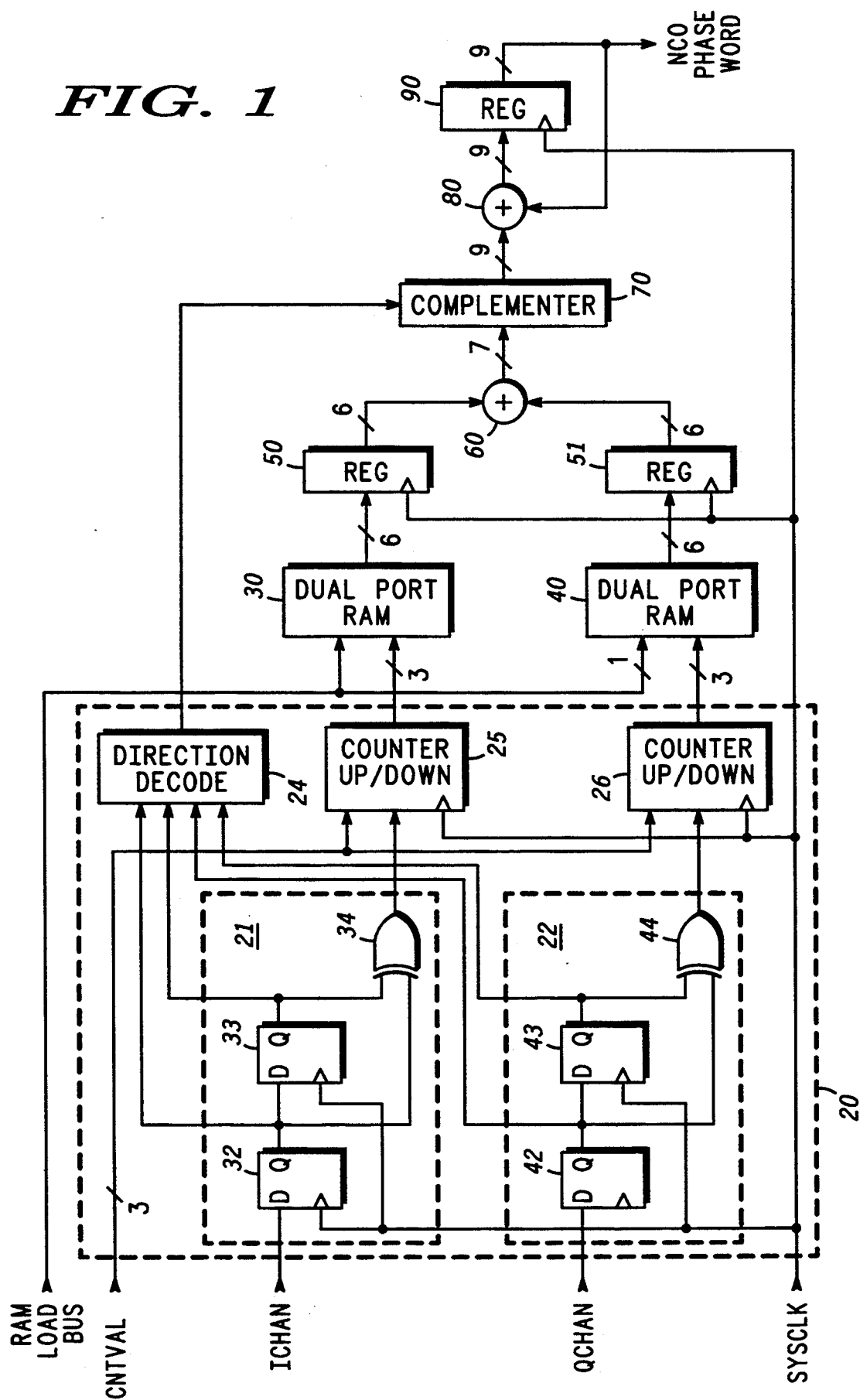
FIG. 1 is a schematic diagram of a fully digital programmable pulse shaping modulator in accordance with the present invention.

FIG. 1 is a schematic diagram of a programmable fully digital phase shaping modulator network. This circuit works with an NCO that has a linear phase input port. The NCO that was used for this design was the Motorola 120NCO. This NCO has an 11 bit phase input port. Digital data input signals ICHAN and QCHAN are transmitted from data generating equipment (not shown) to edge detectors 21 and 22 respectively. The RAM load bus connects the system controller (not shown) to dual port RAMs 30 and 40. The system controller loads in the step values (via RAM load) and the number of steps (CNTVAL) into the modulator circuit. The RAM load bus controls the values in memories 30 and 40 for programming the appropriate step sizes for the modulator to take. The count value (CNTVAL) bus controls setting the step counts for adders 25 and 26. The typical number of steps per phase angle transition are ten steps. For ten steps, CNTVAL will be set to 4. In this case, counters 25 and 26 count from 0 to 4 and then 4 to 0. The phase trajectory is assumed to have odd symmetry about the mid point. Therefore, the same phase step values are used for the lower and upper part of the phase transitions. For eight steps, CNTVAL will be set to 3, etc. The system clock signal (SYSCLK) is transmitted from the system controller (not shown) to edge detectors 21 and 22, counters 25 and 26, registers 50, 51, and 90.

Edge detector 21 is coupled to direction decode 24 and counter 25. Edge detector 22 is coupled to direction decode 24 and to counter 26. Counter 25 is coupled to dual port RAM 30 and provides a counter output to address RAM 30. Counter 26 is coupled to dual port RAM 40 and provides a counter output to address RAM 40. Direction controller 20 includes edge detectors 21 and 22, direction decode 24 and counters 25 and 26. Dual port RAM 30 is coupled to register 50. Dual port RAM 40 is coupled to register 51. Registers 50 and 51 are coupled to adder 60. Adder 60 is coupled to complementer 70. Complementer 70 is coupled to adder 80. Adder 80 is coupled to register 90. The output of register 90 is coupled to a numerically controlled oscillator via the NCO phase word lead and also coupled in a feedback arrangement to adder 80.

Edge detector 21 includes flip-flops 32 and 33 coupled in serial connection and exclusive-OR gate 34 coupled to the outputs of flip-flops 32 and 33. Flip-flop 32 contains the current sample of the data bit on the ICHAN lead. Flip-flop 33 contains the previous sample. When a change is detected between the outputs of flip-flops 32 and 33, exclusive-OR gate 34 will output a signal to counter 25 which will start the address counter. The address counters will first count upward from zero through CNTVAL, and then from CNTVAL back to zero. After all step values are accessed from RAM 30 and/or RAM 40, registers 50 and 51 are reset to zero.

Similarly, edge detector 22 includes flip-flops 42 and 43 serially connected and exclusive-OR gate 44 coupled to the outputs of flip-flops 42 and 43. Flip-flop 42 includes the current sample of the Q channel on the QCHAN lead and flip-flop 43 includes the previous sample of the Q channel output. When exclusive-OR gate 44 detects a change in the outputs of flip-flops 42 and 43, it transmits a signal to counter 26 to start the transition. The outputs of flip-flops 42 and 43 are also coupled to direction decode 24.

Figure 2:
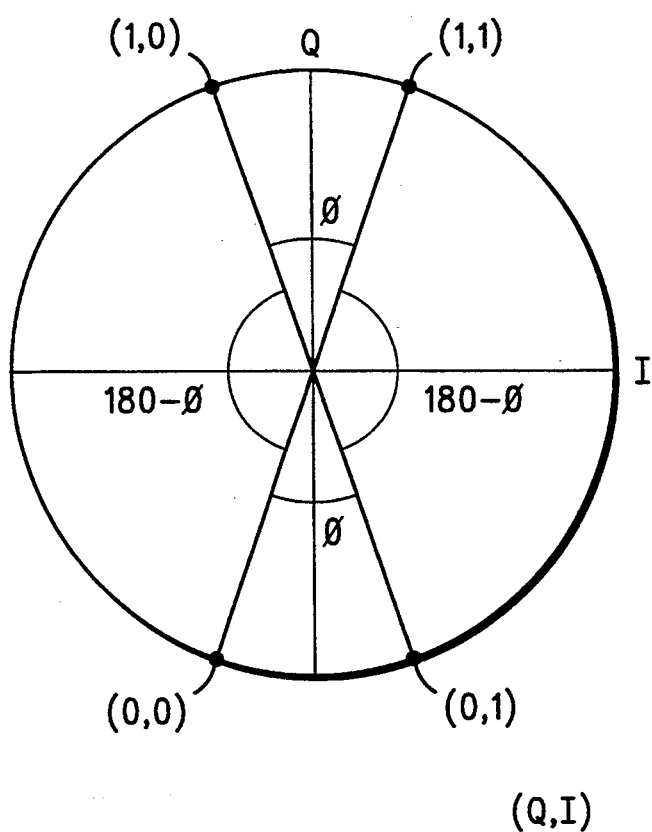
FIG. 2 is a phase diagram for a 4-ary signaling arrangement.

In order to explain direction decode 24, an example of a QPSK (quadrature phase shift keying) modulator will be used. Referring to FIG. 2, a phase diagram for the I and Q vectors of a quadrature phase shift keying system are shown. The I channel is represented on the horizontal axis and the Q channel is represented on the vertical axis. The values of the (Q,I) channels are given by the coordinates for each quadrant. As shown, I=1 and Q=1 as the upper right quadrant; I=0 and Q=1 as the upper left quadrant; I=0 and Q=0 as the lower left quadrant; and I=1 and Q=0 as the lower right quadrant. To move from I=1, Q=1 to I=0, Q=1 an angle O must be moved in the counterclockwise direction. Direction decode 24 produces the correct direction of movement. Truth Table I depicts the direction of movement depending upon the values of the past and present I and Q channels as stored in flip-flops 32, 33, 42, and 43. Since in our example we have selected a movement from 1,1 to 1,0, Q channel first then I, we read from Table I the fifth line from the bottom, the Q channel values past and present are 1,1 and the I channel values past and present are 1,0. The direction of movement indicated is a minus sign which translates to the negative direction counterclockwise which is shown by FIG. 2.

TABLE I

| I Channel | | Q Channel | | |
| --- | --- | --- | --- | --- |
| Past | Present | Past | Present | Direction |
| 0 | 0 | 0 | 0 | NC |
| 0 | 0 | 0 | 1 | + |
| 0 | 0 | 1 | 0 | − |
| 0 | 0 | 1 | 1 | NC |
| 0 | 1 | 0 | 0 | − |
| 0 | 1 | 0 | 1 | NC |
| 0 | 1 | 1 | 0 | NC |
| 0 | 1 | 1 | 1 | + |
| 1 | 0 | 0 | 0 | + |
| 1 | 0 | 0 | 1 | NC |
| 1 | 0 | 1 | 0 | NC |
| 1 | 0 | 1 | 1 | − |
| 1 | 1 | 0 | 0 | NC |
| 1 | 1 | 0 | 1 | − |
| 1 | 1 | 1 | 0 | + |
| 1 | 1 | 1 | 1 | NC | where:
NC=No Change in Direction
+ =Clockwise Direction
− Counterclockwise Direction.

Thus the direction of the phase vector has been determined. Direction decode 24 transmits the determined direction to complementer 70. The direction traveled as shown in FIG. 2, clockwise or counterclockwise, is the shortest phase path. Preprogrammed steps or phase trajectories (values) have been stored in dual port RAMs 30 and 40 by the controller circuit. These preprogrammed steps produce the desired pulse shape and are stored as a set of steps within memories 30 and 40 via the RAM load bus. The trajectory values are read from dual port RAMs 30 and 40 by the address counters 25, 26 and temporarily stored in registers 50 and 51. The step values are added together by adder 60 to produce the sumed transition of the I and Q channels. Complementer 70 sets the sign of the transition to control clockwise or counter clockwise direction. The sign of the complementer 70 is provided by direction decode 24. For a negative transition, the output of the complementer 70 is a one's complement and adder 80 will have a carry-in to produce a two's complement. In this example, only the I channel has a transition; counter 25 is initiated, adder 60 sums the steps of the I channel only, and complementer 70 complements the I channel values for a counter clockwise direction.

Adder 80 adds the complementer 70 value to the previous value stored in register 90. The new added value, the accumulated phase angle, has been stored in register 90 and transmitted to the numerically controlled oscillator (NCO) via the NCO phase word lead.

As can be seen from the above, the digital phase modulator shown may be used in any digital phase modulation transmitter that requires pulse shaping and a constant envelope modulated signal. As an example, likely uses for this invention are in spacecraft transmitters. Further, the present invention overcomes the problem with analog and hybrid pulse shaping modulators. The programmable digital pulse shaping modulator shown eliminates tuning problems; eliminates signal drift with temperature and aging; and minimizes the number of components required for the implementation. Furthermore, the digital phase modulator shown provides for preprogramming the number and size of the steps comprising each of the phase trajectories of the transmitted signals. Also, the pulse shaping in the desired manner is implemented in a programmable fashion via the preprogrammed random access memories (RAM). In addition, the present digital phase modulator is directly compatible with a numerically controlled oscillator for combining the carrier frequency and data information. Lastly, the digital phase modulator shown reduces the out-of-band spectral energy transmitted in adjacent channels by smooth transitioning because a number of small steps are taken for change in digital data thereby eliminating interference among channels.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. A digital pulse shaping phase modulator comprising:

direction controller means for receiving digital data inputs, said direction controller means producing at least first and second counter outputs and a direction output, said first and second counter outputs indicating a number of steps relating to changes in said digital data inputs, said direction output indicating the direction of said steps;

RAM memory means coupled to said direction controller means, said RAM memory means having prestored values corresponding to said steps, said RAM memory means being operated in response to said first and second counter outputs to transmit said prestored values;

said direction controller means including means for dynamically setting said number of steps for each change in each digital data inputs, said means for dynamically setting other prestored values corresponding to said number of steps, said means for dynamically setting coupled to said RAM memory means; and phase accumulator means coupled to said RAM memory means, said phase accumulator means for continuously adding each of said transmitted prestored values to produce a digital accumulated phase angle.

2. A digital pulse shaping phase modulator as claimed in claim 1, wherein said direction controller means includes edge detector means for receiving said digital data inputs and detecting changes in said digital data inputs.

3. A digital pulse shaping phase modulator as claimed in claim 2, wherein said edge detector means includes:
   first edge detector means for detecting digital data in a first channel of said digital data inputs; and
   a second edge detector means for detecting digital data in a second channel of said digital data inputs.

4. A digital pulse shaping phase modulator as claimed in claim 3, wherein said direction controller means further includes:
   first counter means coupled to said first edge detector means, said first counter means initiated in response to detected digital data by said first edge detector means for providing a plurality of sequential addresses indicating the number of steps; and
   second counter means coupled to said second edge detector means, said second counter means being initiated in response to detected digital data by said second edge detector to produce another plurality of sequential addresses indicating the number of steps.

5. A digital pulse shaping phase modulator as claimed in claim 4, wherein said first edge detector means includes:
   a first flip-flop for storing a present value of said digital data of said first channel of input data;
   a second flip-flop coupled to the output of said first flip-flop, said second flip-flop for storing a previous value of said digital data of said first channel; and
   an exclusive-OR gate coupled to said first flip-flop and to said second flip-flop for indicating a digital data change from the previous digital data to the present digital data.

6. A digital pulse shaping phase modulator as claimed in claim 5, wherein said second edge detector means includes:
   a first flip-flop of said edge detector means for storing a present value of said second channel;
   a second flip-flop of said edge detector means coupled to said first flip-flop, said second flip-flop for storing a previous value of said digital data of said second channel; and
   an exclusive-OR gate coupled to the outputs of said first and second flip-flops Qf said edge detector means for indicating a digital data change from said previous digital data to said present digital data.

7. A digital pulse shaping phase modulator as claimed in claim 6, wherein said direction controller means further includes:
   direction decode means coupled to said first and second flip-flops of said first edge detector, and to said first and second flip-flops of said second edge detector;
   said first edge detector providing past and present digital values of said digital data inputs of said first channel;
   said second edge detector providing past and present digital values of said digital data inputs of said second channel; and
   said direction decode means providing a direction indication signal in accordance with the following Table I:

TABLE I

| I Channel | | Q Channel | | Direction Indication |
|---|---|---|---|---|
| Past | Present | Past | Present | Signal |
| 0 | 0 | 0 | 0 | NC |
| 0 | 0 | 0 | 1 | + |
| 0 | 0 | 1 | 0 | − |
| 0 | 0 | 1 | 1 | NC |
| 0 | 1 | 0 | 0 | − |
| 0 | 1 | 0 | 1 | NC |
| 0 | 1 | 1 | 0 | NC |
| 0 | 1 | 1 | 1 | + |
| 1 | 0 | 0 | 0 | + |
| 1 | 0 | 0 | 1 | NC |
| 1 | 0 | 1 | 0 | NC |
| 1 | 0 | 1 | 1 | − |
| 1 | 1 | 0 | 0 | NC |
| 1 | 1 | 0 | 1 | − |
| 1 | 1 | 1 | 0 | + |
| 1 | 1 | 1 | 1 | NC | where:
NC = No Change in Direction;
+ = Clockwise Direction;
− = Counterclockwise Direction;
I channel represents a horizontal axis of a quadrature phase shift keying system; and
O channel represents a vertical axis of a quadrature phase shift keying system.

8. A digital pulse shaping phase modulator as claimed in claim 7, wherein said RAM memory means includes:
   first RAM memory means coupled to said first counter means, said first RAM memory means for producing said prestored values of said steps for said first channel; and
   second RAM memory means coupled to said second counter means, said second RAM memory means for producing said prestored values of said steps for said second channel.

9. A digital pulse shaping phase modulator as claimed in claim 8, wherein each of the first and second RAM memory means comprises a dual port RAM memory.

10. A digital pulse shaping phase modulator as claimed in claim 8, wherein there is further included means for dynamically programming the first and second RAM memory means with values corresponding to a plurality of different steps for altering the shape of said accumulated phase angle.

11. A digital pulse shaping phase modulator as claimed in claim 8, wherein said RAM memory means further includes:
   first register means coupled to said first RAM memory means, said first register means for temporarily storing and forwarding said prestored value of said step of said first channel;
   second register means coupled to said second RAM memory means, said second register means for temporarily storing and forwarding said prestored value of said step of said second channel; and
   first means for adding said temporarily stored and forwarded prestored values of the first and second channels to produce a digital incremental phase angle value, said first means for adding coupled to said first and second register means.

12. A digital pulse shaping phase modulator as claimed in claim 11, wherein there is further included:
   means for complementing a binary form of said digital incremental phase angle value to produce said transmitted values; and
   said means for complementing coupled to said first means for adding and to said direction decode means, said means for complementing further operating to add the value of said direction indication signal to the complemented digital incremental phase angle value.

13. A digital pulse shaping phase modulator as claimed in claim 12, wherein said means for complementing a binary form includes a means for taking the one's complement of said digital incremental phase angle value.

14. A digital pulse shaping phase modulator as claimed in claim 12, wherein said means for complementing a binary form includes means for taking the two's complement of said digital incremental phase angle value.

15. A digital pulse shaping phase modulator as claimed in claim 12, wherein said phase accumulator means includes third register means for storing and forwarding said digital accumulated phase angle.

16. A digital pulse shaping phase modulator as claimed in claim 15, wherein said phase accumulator means further includes second means for adding said complemented digital incremental phase angle value to a previous value of said digital accumulated phase angle value to produce a new digital accumulated phase angle, said second means for adding coupled to said means for complementing and to said third register means.

17. A digital pulse shaping phase modulator as claimed in claim 4, wherein said means for dynamically setting sets said number of steps for said first and second counter means, said means for dynamically setting coupled to said first counter means and to said second counter means.

18. A digital pulse shaping phase modulator comprising:
   first means for determining a magnitude of digital data inputs to be transmitted;
   second means for determining a sign of said digital data inputs to be transmitted, said second means for determining coupled to said first means for determining;
   third means for determining a number of pulse phase steps in each of a plurality of coordinate directions, said third means for determining coupled to said second means for determining;
   means for dynamically changing said number of pulse phase steps in each of said plurality of coordinate directions, said means for dynamically changing coupled to said third means for determining;
   first means for adding the pulse phase steps for each of said plurality of coordinate directions, said first means for adding coupled to said third means for determining;
   means for merging said sign of said digital data inputs with said number of pulse phase steps in each of said plurality of coordinate directions to produce a digital incremental phase angle value, said means for merging coupled to first means for adding and to said second means for determining; and
   second means for adding said digital incremental phase angle value to a previously stored digital accumulated phase angle value to produce a new digital accumulated phase angle value, said second means for adding being coupled to said means for merging.

* * * * *